(12) United States Patent
Foster et al.

(10) Patent No.: US 9,096,472 B2
(45) Date of Patent: Aug. 4, 2015

(54) METHODS OF FORMING A CERAMIC COMPONENT AND A HIGH TEMPERATURE MOLD COMPONENT FOR USE THEREWITH

(75) Inventors: Gregory Thomas Foster, Greer, SC (US); Eric Richard Bonini, Greer, SC (US)

(73) Assignee: General Electric Company, Schenectady, NY (US)

(*) Notice: Subject to any disclaimer, the term of this patent is extended or adjusted under 35 U.S.C. 154(b) by 428 days.

(21) Appl. No.: 13/611,011

(22) Filed: Sep. 12, 2012

(65) Prior Publication Data

US 2014/0070457 A1    Mar. 13, 2014

(51) Int. Cl.
| | |
|---|---|
| C04B 35/64 | (2006.01) |
| C04B 35/622 | (2006.01) |
| B28B 11/24 | (2006.01) |
| B29C 35/00 | (2006.01) |

(52) U.S. Cl.
CPC ............ C04B 35/622 (2013.01); B28B 11/243 (2013.01); *B29C 2035/005* (2013.01)

(58) Field of Classification Search
CPC .................. B28B 11/243; B29C 2035/005
USPC .................................................. 264/671–673
See application file for complete search history.

(56) References Cited

U.S. PATENT DOCUMENTS

| | | |
|---|---|---|
| 4,219,328 A | 8/1980 | Pasco et al. |
| 5,465,780 A | 11/1995 | Muntner et al. |
| 6,403,020 B1 | 6/2002 | Altoonian et al. |
| 6,533,986 B1 | 3/2003 | Fosaaen et al. |
| 7,780,905 B2 | 8/2010 | Dodds |

FOREIGN PATENT DOCUMENTS

EP    2100675 A1    9/2009

*Primary Examiner* — Erin Snelting
(74) *Attorney, Agent, or Firm* — McNees, Wallace & Nurick LLC

(57) ABSTRACT

Methods of forming a ceramic component and a high temperature mold for use therewith are provided. The method includes providing a fixture having a receiving surface configured to receive an unfired ceramic component. The method includes applying a continuous high temperature membrane to a surface of the unfired ceramic component. The method includes covering the continuous high temperature membrane and unfired ceramic component with a high temperature loose media. The method includes heating the unfired ceramic component to a firing temperature. The high temperature mold includes the fixture and a support structure forming a compartment surrounding the fixture. The mold allows the high temperature loose media to be contained within the compartment and to cover the continuous high temperature membrane. The continuous high temperature membrane and high temperature loose media are evenly distributed over the uncured ceramic component and operable to provide constant pressure during processing using the mold.

13 Claims, 4 Drawing Sheets

METHODS OF FORMING A CERAMIC COMPONENT AND A HIGH TEMPERATURE MOLD COMPONENT FOR USE THEREWITH

FIELD OF THE INVENTION

The present invention relates generally to forming ceramic components. More specifically, to a method for forming a ceramic component and a high temperature mold component for forming the ceramic component that provide improved dimensional tolerance control of the ceramic component.

BACKGROUND OF THE INVENTION

Turbine airfoils operate in a high temperature environment and often require internal cooling to obtain a desirable design life cycle and component performance. Ceramic cores are used to create internally cooled geometries that provide a cooling air distribution to meet both efficiency and life targets of the component.

The ceramic core is typically made using a plasticized ceramic compound comprising ceramic flour, binder and various additives. The ceramic compound is injection molded, or transfer molded at elevated temperature in a core die or mold. When the unfired or green core is removed from the die or mold, it typically is placed between top and bottom rigid setters to cool to ambient temperature before core finishing and gauging operations. Unfired or green ceramic cores may warp or twist within the gaps in the rigid setters during cooling, as such, cores may exhibit dimensional variations from one core to the next in a production run of cores. Moreover, the unfired or green core may be improperly contacted by the top or bottom setter such that dimensional variations from one core to the next occur in a production run.

Therefore, a method of forming a ceramic component and high temperature mold component for use with the method of forming the ceramic component that do not suffer from the above drawbacks is desirable in the art.

SUMMARY OF THE INVENTION

According to an exemplary embodiment of the present disclosure, a method of forming a ceramic component is provided. The method includes providing a fixture having a receiving surface, the receiving surface configured to receive an unfired ceramic component. The method includes applying a continuous high temperature membrane to a surface of the unfired ceramic component. The method includes covering the continuous high temperature membrane and unfired ceramic component with a high temperature loose media. The method includes heating the unfired ceramic component to a firing temperature.

According to another exemplary embodiment of the present disclosure, a high temperature mold for forming a ceramic component is provided. The high temperature mold includes a fixture, a support structure, a continuous high temperature membrane, and high temperature loose media. The fixture includes a receiving surface configured to receive a surface of an uncured ceramic component. The support structure surrounds the fixture. The continuous high temperature membrane covers an unfired ceramic component and the continuous high temperature membrane is attached to the support structure forming a compartment. The high temperature loose media is contained within the compartment and covers the continuous high temperature membrane. The continuous high temperature membrane and high temperature loose media are evenly distributed over the uncured ceramic component and operable to provide constant pressure during processing.

According to another exemplary embodiment of the present disclosure a method of forming a ceramic component is provide. The method includes providing a high temperature mold. The high temperature mold includes fixture, a support structure, a continuous high temperature membrane, and high temperature loose media. The fixture includes a receiving surface configured to receive an unfired ceramic component. The support structure surrounds the fixture. The continuous high temperature membrane is operable to cover the unfired ceramic component opposite the receiving surface of the fixture and the continuous high temperature membrane is attached to the support structure forming a compartment. The high temperature loose media is operable to cover the high temperature membrane, the high temperature loose media being adjacent the support structure. The method includes placing the uncured ceramic core on the receiving surface of the fixture, the unfired ceramic core having a first surface and a second surface, the first surface of the unfired ceramic core adjacent the receiving surface of the fixture. The method includes applying the continuous high temperature membrane to the second surface of the unfired ceramic component, wherein the high temperature membrane conforms to the second surface of the unfired ceramic component. The method includes covering the continuous high temperature membrane with the high temperature loose media, wherein the high temperature loose media is contained by the compartment formed by the support structure and the high temperature membrane. The method includes heating the unfired ceramic component to a firing temperature.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a method of forming a ceramic component. The method includes providing a fixture having a receiving surface, the receiving surface configured to receive an unfired ceramic component. The method includes applying a continuous high temperature membrane to a surface of the unfired ceramic component. The method includes covering the continuous high temperature membrane and unfired ceramic component with a high temperature loose media. The method includes heating the unfired ceramic component to a firing temperature.

One advantage of an embodiment of the present disclosure includes providing a method of making ceramic casting cores and other articles using an improved constraint system that reduces dimensional variations as the core/article cools from an elevated temperature to a lower temperature. Another advantage of an embodiment of the present disclosure is that the method and mold provide greater uniformity core finishing operations. Yet another advantage of an embodiment of the present disclosure is reducing the risk of damage to the unfired or green core due to the specific application of force before the core has achieved its fully sintered strength. Another advantage of an embodiment of the present disclosure includes reducing the proclivity for point-loading on the core. Yet another advantage of an embodiment of the present disclosure includes providing a uniform force throughout the thermal cycle thereby improving dimensional stability of the core.

Figure 1:
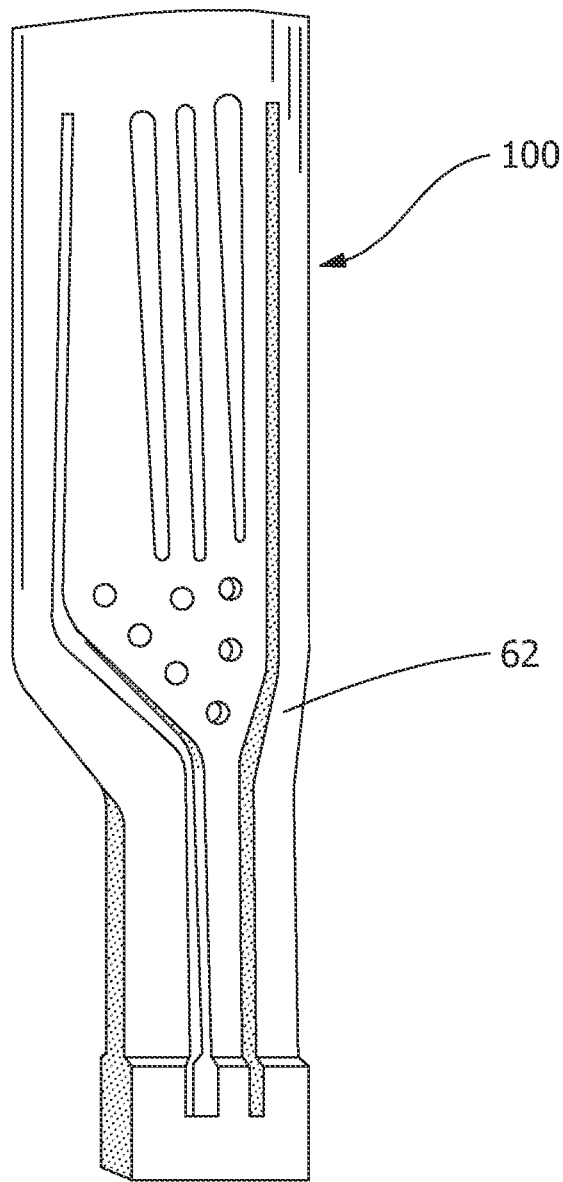
FIG. 1 is a schematic illustration of a ceramic component of the present disclosure.

FIG. 1 is a schematic illustration of a ceramic component 100. The ceramic component 100 is a core for use with a mold during casting of an airfoil for a gas turbine engine.

Although ceramic component 100 is depicted as a core for use in casting of a blade or vane for a gas turbine engine, it should be understood that the ceramic component 100 may have different construction and be utilized for a different purpose if desired. For example, ceramic component 100 may be dinnerware or an electronic component. It is contemplated that the present disclosure may be utilized to maintain different known ceramic articles in the desired configuration during firing of the articles in a furnace or kiln.

Figure 2:
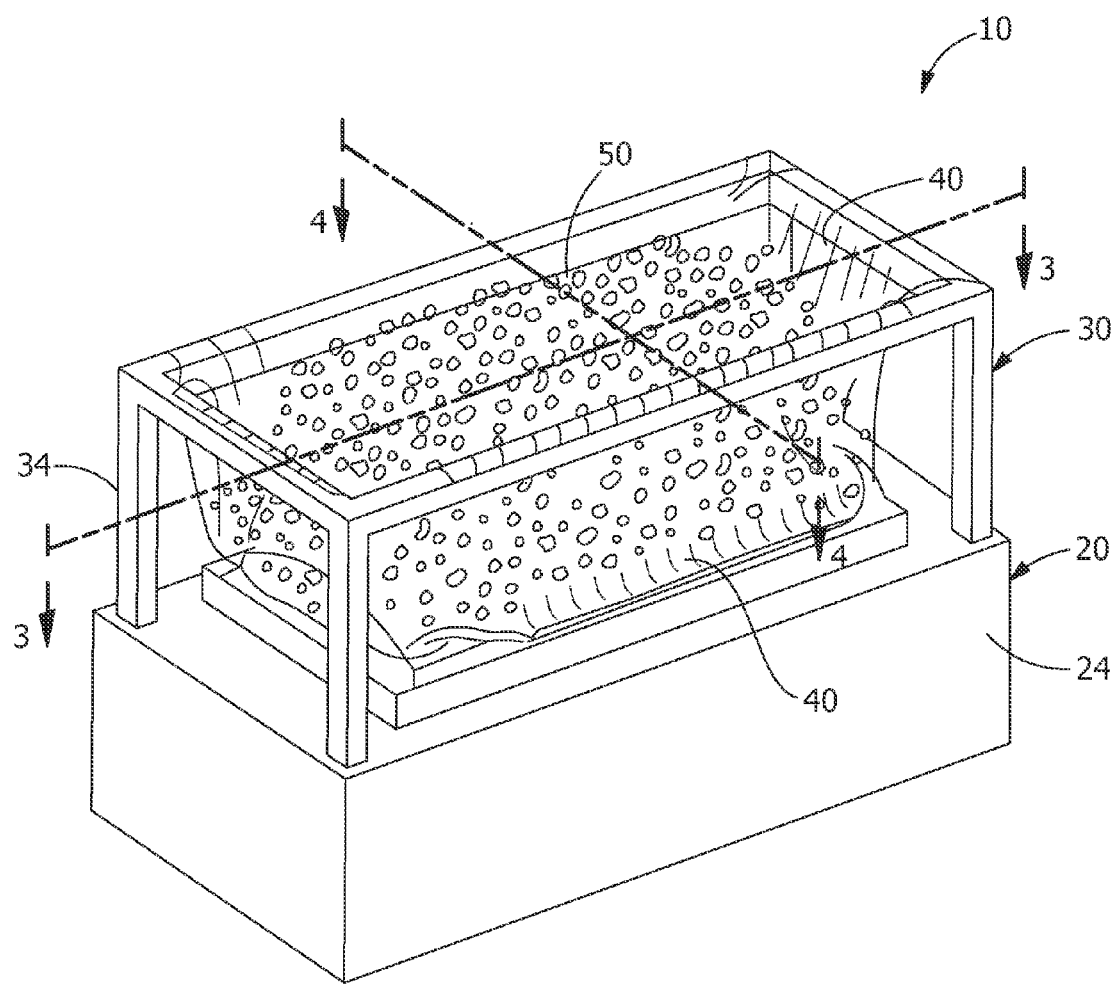
FIG. 2 is a perspective view of a high temperature mold of the present disclosure.

FIG. 2 is a perspective view of a high temperature mold 10 for forming ceramic component 100. High temperature mold 10 includes a fixture 20, a support structure 30, a continuous high temperature membrane 40, and high temperature loose media 50. Fixture 20, as depicted, is a setter block for receiving a surface 62 of an uncured or unfired ceramic component 60. Support structure 30 surrounds fixture 20. Continuous high temperature membrane 40 covers unfired ceramic component 60 and continuous high temperature membrane 40 is attached to support structure 30 to form compartment 32. As used herein, "unfired ceramic component" refers to any ceramic component, green ceramic component, partially fired ceramic component, or fully fired ceramic component, which may undergo a firing cycle, the firing cycle may be the first firing cycle or a final firing cycle. High temperature loose media 50 is contained within compartment 32 and covers continuous high temperature membrane 40. Continuous high temperature membrane 40 and high temperature loose media 50 are evenly distributed over uncured ceramic component 60 and operable to provide constant pressure during processing.

Figure 3:
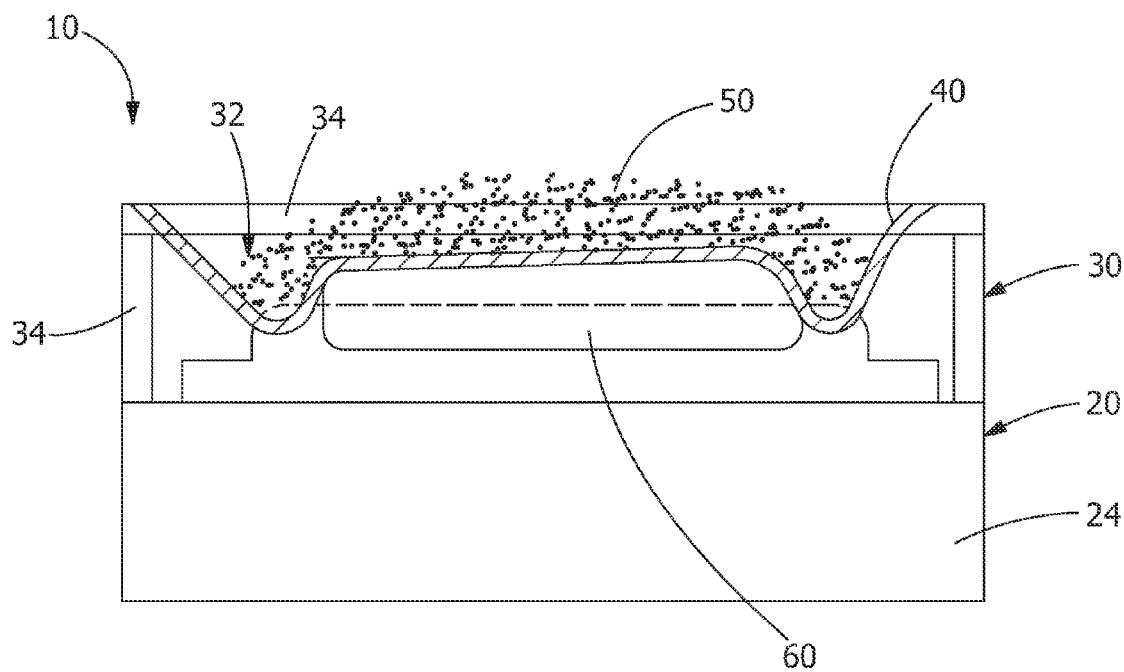
FIG. 3 is a schematic sectional side view of the high temperature mold taken in direction 3-3 of FIG. 2 of the present disclosure.

As shown in FIGS. 1-3, support structure 30 includes arms 34 surrounding base 24 of fixture 20. Arms 34 provide attachment point for high temperature membrane 40 to attach to support structure 30 to form compartment 32 for receiving high temperature loose media 50. Suitable attachment members, include, but are not limited to, hooks, screws, bolts, nails, and combinations thereof. Support structure 30 comprises materials resistant to thermal and load deformation, such as, but not limited to, superalloy structures including any mixture of nickel, cobalt, and any refractory materials and monolithic ceramic structures.

In one embodiment, high temperature membrane 40 comprises a flexible ceramic woven material. Flexible ceramic material has enough flexibility to conform to second surface 64 of unfired ceramic component 60 (see FIG. 3) while containing high temperature loose media. Suitable examples of flexible ceramic woven material, include, but are not limited to, ceramic cloth, ceramic paper, ceramic blankets, and combinations thereof. Flexible ceramic materials include aluminoborosilicate, commercially available as NEXTEL® 312 or NEXTEL® 440 from 3M Ceramic Textiles and Composites, St. Paul, Minn.

Figure 4:
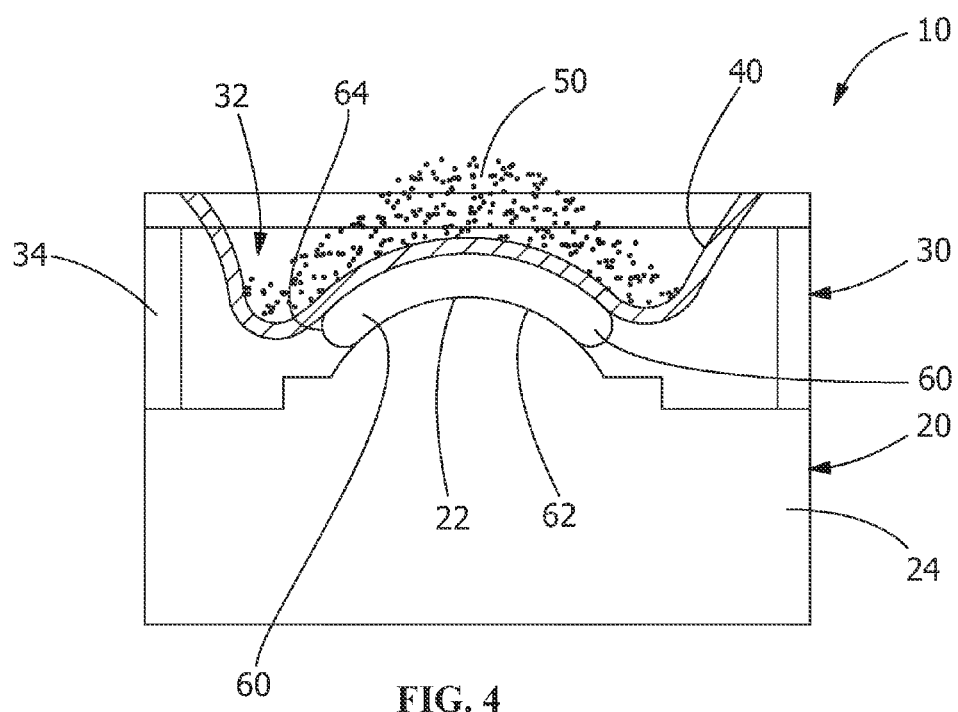
FIG. 4 is a schematic sectional front view of the high temperature mold taken in direction 4-4 of FIG. 2 of the present disclosure.

As shown in FIGS. 2-4, high temperature loose media 50, contained by support structure 30 and high temperature membrane 40, conforms to geometry of unfired ceramic component 60 reducing any point loads that would normally form with a rigid upper setter block. High temperature loose media 50 is selected from materials, such as, for example, refractory particles, such that the particles do not sinter together at the firing temperature. Suitable examples of high temperature loose media 50, include, but are not limited to, alumina particles, mullite particles, depending on firing temperature, which ranges from about 800° C. (about 1472° F.) to about 1500° C. (about 2732° F.). High temperature loose media 50 generally have a particle size of about 5 mesh to about 100 mesh, or alternatively about 10 mesh to about 90 mesh, or alternatively about 20 mesh to about 80 mesh. Without being bound by theory, high temperature loose media 50 generally increases the loaded surface area, and reduces the pressure applied to the unfired ceramic component 60, while still enabling the desired downward force to ensure proper mating with the fixture 20 or lower setter surface.

As shown in FIGS. 2-4, continuous high temperature membrane 40 and high temperature loose media 50 apply uniform pressure to unfired ceramic component 60 during firing. As the temperature is increased during firing, the unfired ceramic component 60 becomes more ductile, enabling the force of both gravity and high temperature loose media 50, transferred by high temperature membrane 40 to effectively "seat" or position the unfired ceramic component 60 against fixture 20 or the lower setter surface. This interaction between high temperature loose media 50, high temperature membrane 40 and fixture enables greater control over ceramic component 100 dimensions, both in accuracy and precision.

Depending on the desired application for ceramic component 60, the amount of high temperature loose media 50 used is varied. In one embodiment, as shown in FIGS. 2-4, the high temperature loose media 50 completely covers unfired ceramic component 60. In an alternative embodiment, high temperature membrane 40 is adjacent to only a portion of unfired ceramic core 60 and high temperature loose media 50 only covers a portion of unfired ceramic component. In one embodiment, the amount of high temperature loose media 50 applied to continuous high temperature membrane and uncured ceramic component 60 is up to about 50% of the module of rupture of the uncured ceramic component 60.

High temperature mold 10 is reusable because support structure 30, continuous high temperature membrane 40 and high temperature loose media 60 are constructed from materials that withstand high temperatures during firing of uncured ceramic component 60 to obtain ceramic component 100.

Figure 5:
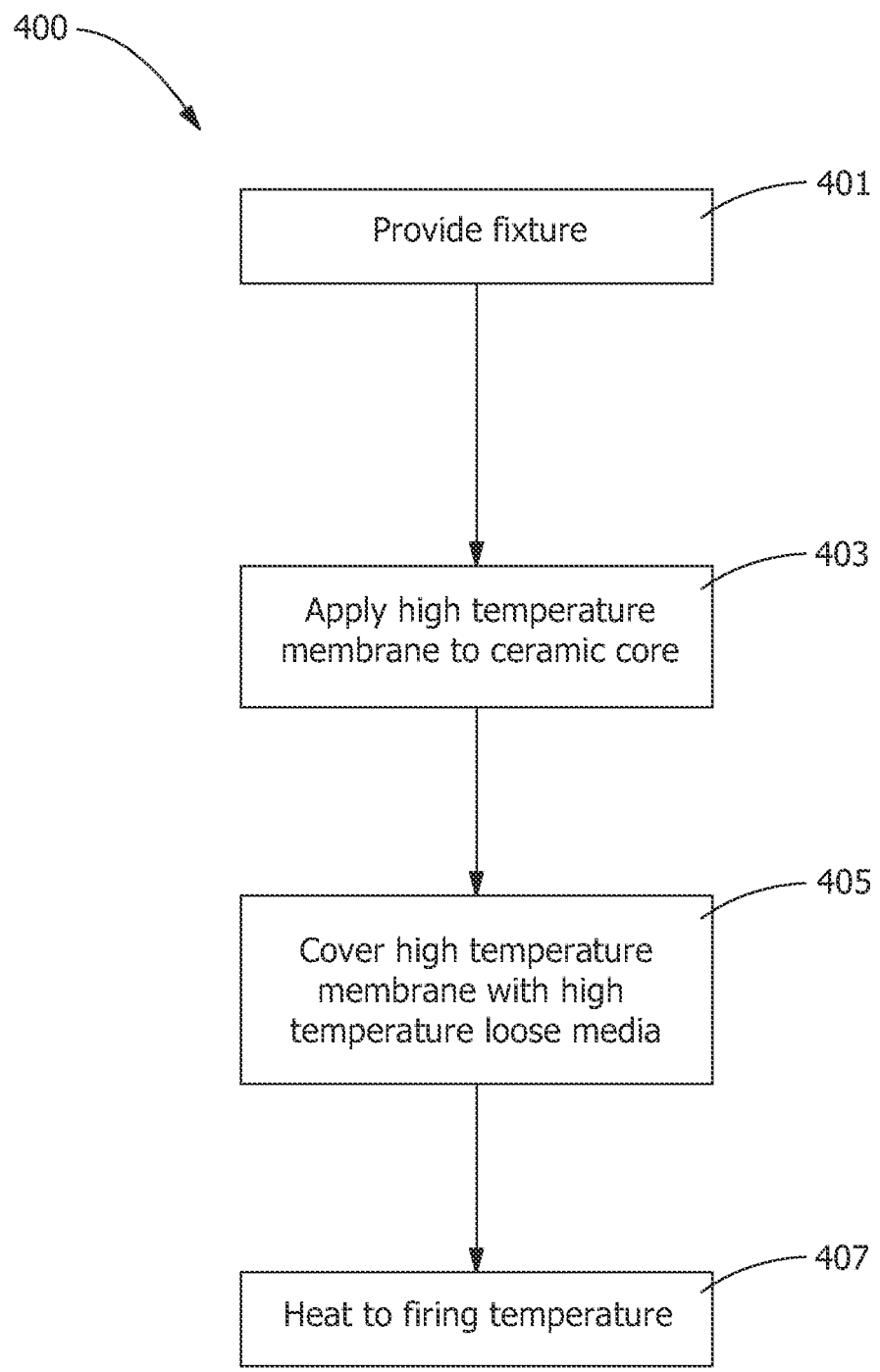
FIG. 5 is a flow chart of an exemplary method of forming a ceramic component of the present disclosure.

FIG. 5 is a flow chart describing a method 400 of forming ceramic component 100. Method includes providing fixture 20 having a receiving surface 62 being configured to receive unfired ceramic component 60, step 401 (see FIGS. 2-4). Fixture 40 is part of high temperature mold 10. As described above, high temperature mold 10 includes fixture 20, support structure 30 surrounding fixture 20, continuous high temperature membrane 40 and high temperature loose media 50. First surface 62 of unfired ceramic component 60 is placed adjacent to receiving surface 22 of fixture 20. Method 400 includes applying continuous high temperature membrane 40 to second surface 64 of the unfired ceramic component 60, step 403 (see FIGS. 2-4). Continuous high temperature membrane 40 is operable to cover unfired ceramic component 60 opposite receiving surface 22 of fixture 20 and continuous high temperature membrane 40 conforms to second surface 64 of unfired ceramic component 60. Continuous high temperature membrane 40 is attached to support structure 30 and forming compartment 32. Method 400 includes covering continuous high temperature membrane 40 and unfired ceramic component 60 with high temperature loose media 50, step 405 (see FIGS. 2-4). High temperature loose media 50 is contained by compartment 32 formed by support structure 30 and high temperature membrane 40. Continuous high temperature membrane 40 and high temperature loose media 50 are evenly distributed over uncured ceramic component 60 and operable to provide constant pressure during processing. Method 400 includes heating unfired ceramic component 60 to a desired firing temperature of about 800° C. (about 1472° F.) to about 1500° C. (about 2732° F.), step 407. After heating, ceramic component 100 is cooled before removing from high temperature mold 10.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a ceramic component comprising:
    providing a fixture having a receiving surface, the receiving surface configured to receive an unfired ceramic component;
    applying a continuous high temperature membrane to a surface of the unfired ceramic component; and
    covering the continuous high temperature membrane and unfired ceramic component with a high temperature loose media; and
    heating the unfired ceramic component to a firing temperature of about 800° C. to about 1500° C.,
    wherein the fixture is surrounded by a support structure, the support structure and high temperature membrane forming a compartment surrounding the fixture for containing the high temperature media.

2. The method of claim 1, comprising an additional step of, after the step of heating, cooling the ceramic component.

3. The method of claim 1, wherein the continuous high temperature membrane comprises a flexible ceramic woven material.

4. The method of claim 1, wherein the continuous high temperature membrane is selected from a flexible woven material including ceramic cloths, ceramic papers, ceramic blankets, and combinations thereof.

5. The method of claim 1, wherein the high temperature loose media comprises refractory particles.

6. The method of claim 1, wherein the amount of high temperature loose media applied to the continuous high temperature membrane and unfired ceramic component applies a pressure to the unfired ceramic component which is up to about 50% of the modulus of rupture of the unfired ceramic component.

7. The method of claim 1, wherein the continuous high temperature membrane and high temperature loose media apply uniform pressure to the ceramic core during tiring.

8. The method of claim 1, wherein the continuous high temperature membrane is applied to a portion of the surface of the unfired ceramic component.

9. The method of claim 1, wherein the receiving surface of the fixture has an airfoil shape.

10. The method of claim 1, wherein the support structure includes at least one attachment member for receiving the continuous high temperature membrane.

11. The method of claim 1, wherein the support structure comprises materials resistant to thermal and load deformation.

12. The method of claim 1, wherein the continuous high temperature membrane is attached to the support structure.

13. A method of forming a ceramic component comprising:
    providing a high temperature mold comprising:
        a fixture having a receiving surface, the receiving surface configured to receive an unfired ceramic component;
        a support structure surrounding the fixture;
        a continuous high temperature membrane operable to cover the unfired ceramic component opposite the receiving surface of the fixture, the continuous high temperature membrane attached to the support structure and forming a compartment; and
        a high temperature loose media operable to cover the high temperature membrane, the high temperature loose media being adjacent to the support structure;
    placing the unfired ceramic core on the receiving surface of the fixture, the unfired ceramic core having a first surface and a second surface, the first surface of the unfired ceramic core adjacent to the receiving surface of the fixture;
    applying the continuous high temperature membrane to the second surface of the unfired ceramic component, wherein the high temperature membrane conforms to the second surface of the unfired ceramic component;
    covering the continuous high temperature membrane with the high temperature loose media, wherein the high temperature loose media is contained by the compartment formed by the support structure and high temperature membrane; and
    heating the unfired ceramic component to a firing temperature of about 800° C. to about 1500° C.

* * * * *